(12) United States Patent
Simberg

(10) Patent No.: US 7,265,301 B2
(45) Date of Patent: Sep. 4, 2007

(54) WEIGHT TRACKING SCALE AND METHOD OF USE

(76) Inventor: Brittani Simberg, 1107 Princeton St., #104, Santa Monica, CA (US) 90403

( * ) Notice: Subject to any disclaimer, the term of this patent is extended or adjusted under 35 U.S.C. 154(b) by 0 days.

(21) Appl. No.: 11/240,539

(22) Filed: Sep. 30, 2005

(65) Prior Publication Data

US 2007/0074911 A1 Apr. 5, 2007

(51) Int. Cl.
*G01G 19/415* (2006.01)

(52) U.S. Cl. .............. 177/25.13; 177/25.16; 177/25.19; 128/921

(58) Field of Classification Search .. 177/25.11–25.17, 177/25.19; 128/921
See application file for complete search history.

(56) References Cited

U.S. PATENT DOCUMENTS

| 4,366,873 A | 1/1983 | Levy et al. | |
|---|---|---|---|
| 4,423,792 A | 1/1984 | Cowan | |
| 4,576,244 A | 3/1986 | Zeigner et al. | |
| 4,711,313 A * | 12/1987 | Iida et al. | 177/127 |
| 4,773,492 A | 9/1988 | Ruzumna | |
| 6,538,215 B2 * | 3/2003 | Montagnino et al. | 177/25.16 |
| 6,617,530 B1 | 9/2003 | Lin | |
| 6,864,436 B1 | 3/2005 | Nobes et al. | |
| 2002/0134589 A1 * | 9/2002 | Montagnino et al. | |
| 2006/0006005 A1 * | 1/2006 | Dumornay et al. | |

OTHER PUBLICATIONS

Measurement Specialists, Inc., The Load Cell Source, www.measurespec.com/tips/principles.htm, Measurements Specialists, Load Cell Overview, © 2000.

* cited by examiner

*Primary Examiner*—Randy W. Gibson
(74) *Attorney, Agent, or Firm*—Kevin P. Crosby; Brinkley, Morgan et al.

(57) ABSTRACT

The present invention provides an improved scale that only shows a user how much weight he or she has gained or lost. The scale includes a weight sensing apparatus and a numerical display. A computer stores a user's initial pre-diet weight, and then compares that weight to the user's weight from time to time as the user progresses through his or her diet. The only information displayed is the current date and the magnitude of the weight differential (e.g. "+5" lbs or kg). In this way, the user can avoid learning, and possibly fixating, on his or her actual weight.

12 Claims, 2 Drawing Sheets

WEIGHT TRACKING SCALE AND METHOD OF USE

BACKGROUND OF THE INVENTION

1. Field of the Invention

This invention relates to the field of weight management and, more particularly, pertains to an improved scale and method of use.

2. Description of the Background Art

Weight management in the United States is a multi-billion dollar per year industry. There are thousands of different weight loss or weight management plans, gyms and exercise clubs, supplements and other dietary products that help individuals achieve their weight goals.

There are also many variations of weighing scales in the prior art. There are scales designed to chastise you if you gain too much weight. There are scales that can tell you the amount of body fat you have or the amount of calories you need to ingest in order to maintain or lose weight. All prior art scales display a user's current weight.

U.S. Pat. No. 6,617,530 to Lin discloses a scale that plays a message to remind the user to use the scale and a message reflecting the user's weight change. Lin's scale display includes the user's initial weight, current weight and the difference between the two. Sunbeam Products has obtained patent protection (U.S. Pat. No. 6,538,215) for a scale that creates a profile from a user's age, sex, height, body frame type and weight. The scale, driven by a computer, provides the user with their current weight, the percentage change in their weight, a graph of a minimum and maximum weight for the average person matching the user's profile, a thirty day rolling graph of the user's weight history, body fat measurements and information about the number of calories that should be consumed.

It is well-known that many people, including dieters, do not wish to know their actual weight, as to do so has an undesirable psychological effect on them. These people want a scale that allows them to track their weight change without viewing their weight.

The need exists, therefore, to provide a scale for use by dieters who do not wish to learn their actual weight, but instead want only to see whether they have gained or lost weight and the magnitude of that gain or loss.

It is, therefore, a primary object of my invention to provide a scale that monitors nothing more than the fluctuations in a person's weight.

SUMMARY OF THE INVENTION

To address these and other needs, the present invention provides a scale readily adapted to calculate and display the difference between a current weight and a prior stored weight as a user progresses through a weight loss program.

The present invention also provides methods for rapidly and easily determining a person's change in weight.

The present invention also provides the weight loss over a period of time.

Finally, the present invention may include a locking feature to prevent a person from altering their initial or reference weight.

DETAILED DESCRIPTION

Figure 1:
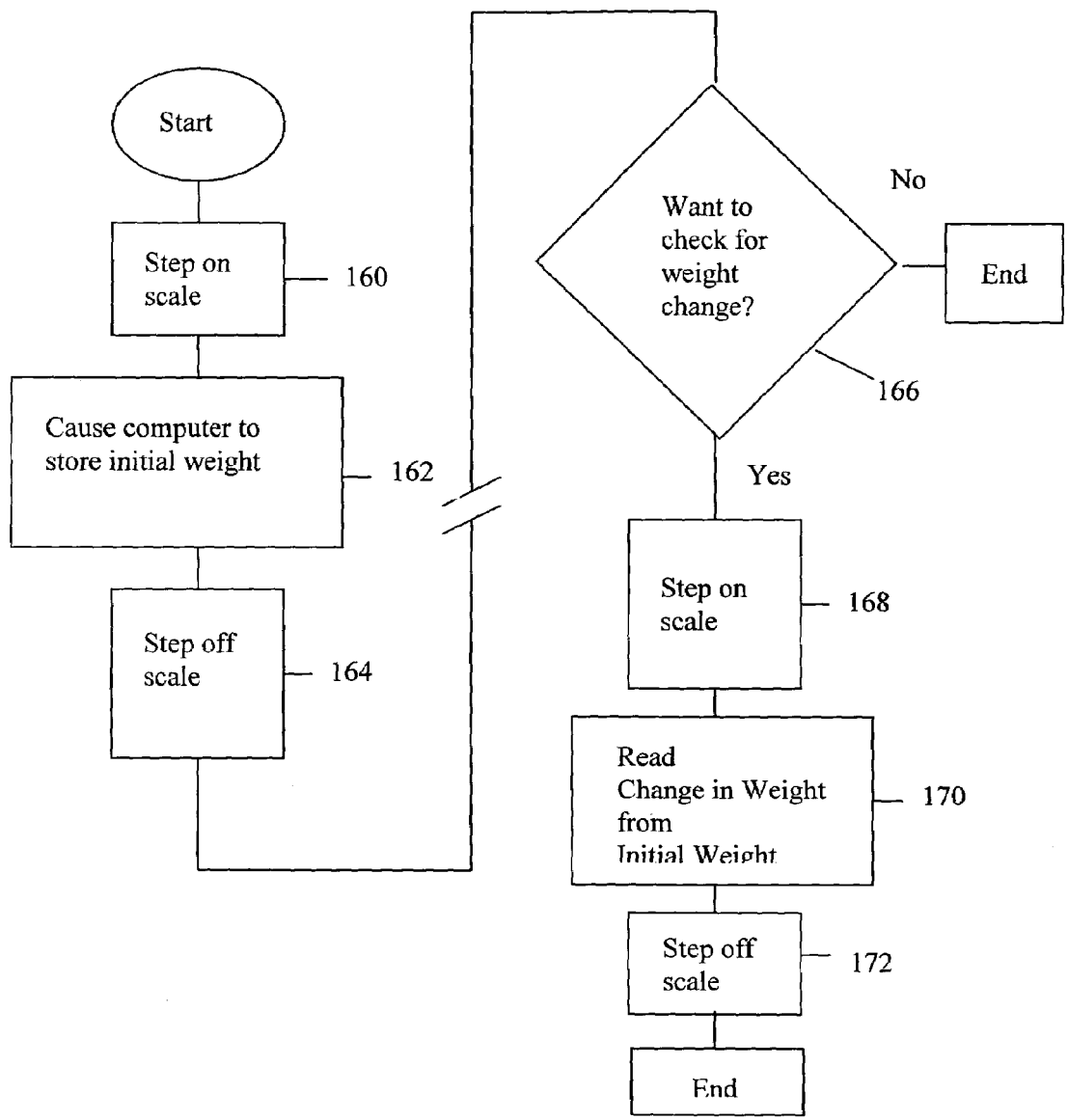
FIG. 1 is a flow diagram illustrating the operation of the scale of the present invention.

Weight is a measure of the force with which a body is attracted to the Earth and equals the product of the object's mass and the acceleration of gravity. Weight is commonly measured in pounds (lbs) or kilograms (kg), but may also be measured in scruples, grains, and pennyweights. The present invention can be designed to work with any combination of these units of measure.

As discussed previously, many scales have been developed to help monitor weight. These scales can be divided into two categories: analog and digital. The present invention can be practiced with either category of scale.

In general, a user who is about to commence a weight loss program or wishes to monitor his/her weight will acquire a scale in accordance with the instant invention and step onto the scale such that the scale measures the user's weight. The particular apparatus within or associated with the scale for measuring the user's weight being any apparatus which will occur to those skilled in the art. The user will then cause the scale to retain in memory the user's weight, which will be referred to hereinafter as the "initial weight" or "reference weight," as well as the date or other reference indicia representative of the date ("start date") on which the initial or reference weight was recorded. This storage of the initial or reference weight and start date can be accomplished by pressing a button or any other apparatus, known as the display adjustment mechanism, which will cause the computer associated with the scale to store the initial or reference weight.

To help prevent a user from manipulating the scale, the scale may include means for locking the "initial weight" or "reference weight" so that it cannot be stored again subsequent to the initial weighing for a predetermined time interval, for example 30 days, 60 days or 90 days. In other words, if a user gains two pounds the day after storing the initial or reference weight, the scale will prevent the user from resetting the initial or reference weight to include the newly added two pounds. One of ordinary skill in the art will recognize that these durations in time for the lock are suggestions and may be altered. For example, one user may wish to monitor his/her weight for a one-year duration and another may wish to monitor his/her weight for multiple durations of one week. The scale may be designed with a default lock setting of, for example, 30 days. However, prior to recording the initial or reference weight, the user can alter the duration to suit the needs of his/her weight loss/maintenance program. In the preferred embodiment, once the initial weight is stored, the user cannot alter the lock's duration of time until the expiration of the currently set time duration.

At any later time, after the initial reading, the user may again step upon the scale to see whether he or she has lost or gained weight or maintained the same weight. A display associated with the scale will display the current date and the difference in the weight between the then-current weight of the user and the initial or reference weight, accompanied by a "+" or a "−" symbol, depending upon whether the weight differential is a positive or a negative value. A positive value will indicate that the user has gained weight since the commencement of the weight loss program, and a negative value will indicate that the user has lost weight. The instant invention may also be used by those who are attempting to maintain a steady weight, such as athletes, entertainers, etc.

A user can also track his/her weight loss over time because the scale records both the start date and initial or reference weight. A user can depress a button associated with the scale and switch from a view of the weight difference to a view of the weight change per time. When this button is actuated, the computer takes the weight difference and divides it by the number of days, the number of weeks or the number of months since the initial or reference weight was stored. Once again, no actual weight values are displayed. This alternate view may be used to provide a user with alternate motivation. For example, if a user maintains a steady reading of −5 for two weeks and then obtains a reading of −4 the third week, the user has gained a pound, which may be disheartening to the user. However, the user can switch display views and see that he/she has lost more than 1 pound per week since he/she started. This may provide the motivation to maintain his/her exercise routine, diet or both. Another user may rapidly lose 15 pounds and then plateau for ten weeks at that reading. When the user steps on the scale, they see "−15," which provides positive reinforcement and may make the user negligent in their exercise or eating routine. However, on the tenth week, when the user switches display views, they see that they have only lost 1.5 pounds per week. This may motivate the user to exercise more often or alter his/her diet to achieve additional weight loss.

Referring now to the drawings, FIG. 1 is a flow diagram illustrating the operation of the present invention. In step 160, any person who wishes to monitor fluctuations in their weight steps on a scale designed in accordance with the present invention. The user causes the computer associated with the scale to store the initial or reference weight at step 162. This may be accomplished by pressing a button or otherwise signaling to the computer via a display adjustment mechanism that the weight of the user on the scale at that time is to be stored as the initial or reference weight. This also may result in the display reading "0", but need not. In other words, the step of setting the initial or reference weight may, but need not necessarily, result in a value of "0" appearing on the display. However, if at a subsequent time the user steps on a scale and has not lost or gained any weight, the number that will be shown on the display will be the digit "0". The display adjustment step corresponds to storing the initial or reference weight and provides the reference to which subsequent weights will be compared. As discussed previously, the scale may be designed so that the initial or reference weight cannot subsequently be stored again for a period of 30 days, 60 days or 90 days, to prevent a user from cheating.

In step 164, the user steps off the scale. At a subsequent time and/or date, the user decides to check his or her weight loss or weight gain progress, as depicted in step 166. The user steps back on the scale in step 168. In step 170, the scale automatically displays the change in weight that has occurred since the initial or reference weight was stored in step 162. The user steps off the scale in step 172 knowing the exact change in weight that has occurred since the initial reading.

Figure 2:
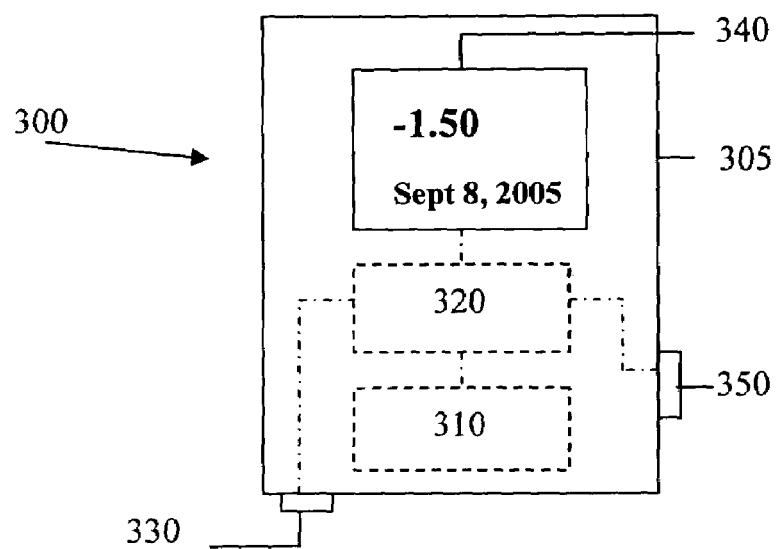
FIG. 2 is a top plan view of a scale in accordance with the present invention.

FIG. 2 is a top plan view of a scale 300 in accordance with the present invention. The scale comprises one or more standard weight sensor(s) 310, one or more central processing unit(s) 320, one or more display adjustment mechanism(s) 330, a display 340 associated with, and preferably incorporated within, a housing 305, and a button 350 to permit the user to switch display views. The term "weighing mechanism" when used throughout the specification and claims refers to the combination of weight sensor(s) 310 and central processing unit(s) 320. The components of the scale 300 can be operated by any suitable power source, such as batteries or conventional wall outlet (not shown).

A user steps on the scale 300 and utilizes the display adjustment mechanism 330 to store his or her initial or reference weight, referred to as steps 160 and 162 in FIG. 1. At a subsequent time, the same user re-measures his or her weight. The central processing unit 320 of the scale subtracts the subsequent weight from the initial or reference weight and displays the difference as a "+" or "−" value to represent only the amount of weight gained or lost by the person. The user is not required to remember or write down any information or perform any math to determine the change in weight that has occurred. Moreover, the only information displayed is the current date and the weight differential between the initial or reference weight and the then-current weight of the user. In this way, the user does not get any potentially distracting or unfavorable information, nor does the user learn his or her actual weight, which can be counter-productive in some dieters.

The user may also wish to view his/her progress over time. In that scenario, the user simply activates button 350 to switch to a display of weight change per time interval. The central processing unit 320 calculates the difference between the initial weight and the current weight and divides the resulting value by the time interval that has passed since the initial weight was stored. As described previously, this alternate display may provide additional motivation to the user to maintain or enhance his/her weight goal program.

The scale 300 may also be designed to accommodate more than one user by the addition of one or more additional display adjustment mechanism(s) 330, one per additional user. As described above, each display adjustment mechanism can be equipped with its own locking feature to prevent a user from altering their initial or reference weight. In this embodiment, a user will depress the display adjustment mechanism 330 to which he/she has been assigned prior to stepping on the scale 300 in order to provide the scale 300 with the proper initial or reference weight. In an alternate embodiment, the scale 300 may be designed with a toggle switch (not shown) that can be manually switched to the specific user.

The invention has been shown and described herein in the form of a preferred embodiment with alternative features. It is to be understood, however, that the scope of the invention is not limited to the embodiment and additional features disclosed herein, and that the invention is intended to be limited only by the following claims.

What is claimed is:

1. An improved scale comprising:
   a weighing platform;
   a display, wherein the display only displays:
      the current date and
      the difference between a first weight of a person and a subsequent weight of the person; and
   a lock associated with the scale which prevents the user from subsequently altering the reference value during a weight gain, loss or maintenance program.

2. The improved scale of claim 1 wherein the lock is set for a duration of 30 days, 60 days, or 90 days.

3. A method of determining weight change in a person over time, comprising the steps of:
   measuring an initial weight;
   storing the initial weight;
   measuring a current weight;

prior to measuring the current weight, but after storing the initial weight, measuring at least one intermediate weight;

displaying only the current date and a numerical representation of a difference between the current weight and the initial weight, and not displaying any other information.

4. The method of claim 3 wherein the difference between the current weight and the initial weight is calculated by the step of subtracting the current weight from the initial weight prior to displaying the difference between the current weight and the initial weight.

5. The method of claim 3 wherein the difference between the current weight and the initial weight is calculated by the steps of:

subtracting the current weight from the initial weight to yield a difference;

dividing the difference by a time interval that has passed since the initial weight was recorded; and displaying the difference per time interval.

6. A method of determining weight change in a person over time, comprising the steps of:

measuring an initial weight;

storing the initial weight;

measuring a second weight;

displaying only the current date and a difference between the second weight and the initial weight, and not displaying any other information; and precluding the user from altering the initial weight for a predetermined time period.

7. An improved scale comprising:

a housing;

a weight sensor associated with the housing;

a display associated with the housing;

a central processing unit operatively connected to both the weight sensor and the display, the central processing unit including a computer adapted to:

receive date and weight values;

calculate differences between the weight values; and cause the display to display the current date and the difference between the weight values;

the central processing unit further including means for permitting a user to set a reference weight corresponding to a weight of the user at the commencement of use of the scale and means for locking the reference weight for a predetermined duration of time.

8. An improved scale comprising:

a housing;

a weight sensor associated with the housing;

a display associated with the housing; and a central processing unit operatively connected to the weight sensor, the display, the memory, and the real-time clock, the central processing unit adapted to:

receive date and weight values, store a reference weight value corresponding to a first weight of a user at the commencement of use of the scale and a corresponding date indicating when the first weight was measured, measure a duration of time lapsed since measuring the first weight, calculate a difference between the reference weight value and a current weight value corresponding to a current weight of a user, wherein at least one intermediate weight has been measured between receiving the reference weight value and receiving the current weight value, and cause the display to display only the current date and a numerical representation of the difference between the reference weight value and the current weight value.

9. The improved scale of claim 8, wherein the central processing unit further includes means for permitting a user to store the reference weight value.

10. The improved scale of claim 8, wherein the central processing unit includes means for permitting each of several users to store a reference weight value, each reference weight value corresponding to a weight of each of the several users at the commencement of each user's use of the scale.

11. The improved scale of claim 8, further comprising an alternate display option that only displays a rate of weight change per time interval.

12. The improved scale of claim 11 wherein the alternate display is activated by pressing a button associated with the scale.

* * * * *

UNITED STATES PATENT AND TRADEMARK OFFICE
CERTIFICATE OF CORRECTION

| | |
|---|---|
| PATENT NO. | : 7,265,301 B2 |
| APPLICATION NO. | : 11/240539 |
| DATED | : September 4, 2007 |
| INVENTOR(S) | : Brittani Simberg |

Page 1 of 1

It is certified that error appears in the above-identified patent and that said Letters Patent is hereby corrected as shown below:

Column 6, line 8, "the memory, and the real-" should be changed to --a memory, and a real- --.

Signed and Sealed this

Fourth Day of November, 2008

JON W. DUDAS
*Director of the United States Patent and Trademark Office*